(12) United States Patent
Workman, Jr.

(10) Patent No.: US 8,959,127 B1
(45) Date of Patent: Feb. 17, 2015

(54) HAND HELD DEVICE WITH MEMORY FOR CALCULATING SPLIT TIMES

(76) Inventor: Harold Workman, Jr., Clyde, OH (US)

(*) Notice: Subject to any disclaimer, the term of this patent is extended or adjusted under 35 U.S.C. 154(b) by 550 days.

(21) Appl. No.: 13/251,206

(22) Filed: Oct. 1, 2011

Related U.S. Application Data

(60) Provisional application No. 61/389,216, filed on Oct. 2, 2010.

(51) Int. Cl.
*G06F 15/02* (2006.01)

(52) U.S. Cl.
USPC .......................................... 708/130; 345/169

(58) Field of Classification Search
None
See application file for complete search history.

(56) References Cited

U.S. PATENT DOCUMENTS

| | | | | |
|---|---|---|---|---|
| 4,035,627 A | * | 7/1977 | Dickinson et al. | 708/130 |
| 2010/0217559 A1 | * | 8/2010 | Schrock et al. | 702/149 |

* cited by examiner

*Primary Examiner* — Michael D Yaary
(74) *Attorney, Agent, or Firm* — Jerry Semer (57) ABSTRACT

The device is a handheld calculating machine with memory that is specifically designed to calculate the split times for runners, swimmers, and bicyclist. The handheld device is programmed such that a coach can input the distance of the race, the time the athlete wishes to run the race, and the distance of the split, and the handheld device will calculate the time in which the runner needs to run the splits. The handheld device is also designed with a memory. A coach can keep the split times on many athletes and/or the split times for an athlete who runs several races. The handheld device can be a specific device designed for this use or a Smartphone or a tablet computer such as the iPad which runs a program to calculate the split times.

9 Claims, 6 Drawing Sheets

HAND HELD DEVICE WITH MEMORY FOR CALCULATING SPLIT TIMES

This application is a continuation in part of prior application No.: 61\389,216, filed Oct. 2, 2011.

FIELD OF THE INVENTION

This invention relates to the field of devices for calculating splits times for athletes for practicing and competition and more particularly to the field of small hand held devices that calculate and memorize split times for runners and coaches.

BACKGROUND OF THE INVENTION

A coach practicing a track team needs to calculate many times during the day split times for his athletes. In practicing for a running event, individuals usually workout by running several spits with short periods of rest in between. A split is a short distance that the individual runs. Usually the coach wishes the athlete to run several splits at the same pace. For example a coach wanted a runner to run a five thousand meter race in 15 minutes. For this race he wants to know how fast the runner needs to run each four hundred meter (one circuit of the average track) split or distance. Thus, the coach would need to calculate the number of times four hundred meters goes into five thousand meters. Then he would need to divide that number into 15 minutes, to find how fast his runner would need to run each four hundred meter split. This is a time consuming chore.

The only technology on the market today to help with this chore is a slide rule type of device. With this device the calculation of split times is still time consuming and the rule is difficult to operate. The end objective of this invention is to develop a simple device that can quickly calculate split times for runner. The inventor does this by creating a hand held device in which only the race distance, split distance, and time for achieving the race distance is entered and the hand held device calculates the split time.

The hand held device is also designed to solve another problem. This problem is that a coach has to calculate the split times for many athletes, many of whom will be in more than one event. Further, he must keep track of each athlete's times over the period of time he is coaching that athlete. Thus, another objective of the invention is to allow a coach to calculate split times and keep track of these times for several different athletes. The inventor has achieved this by developing a hand held device with a memory in which the names of each runner can be placed as well as his split times.

Coaches often wished to be able to time their athletes as well as see the split time that the athlete should be running. This enables the coach to yell to his runner to speed up or slow down or tell his runner that he is on pace. Thus one of the objectives of this invention is to be able to time a runner while he is running. To meet this objective, the inventor has placed a stopwatch within the hand held device. The ease of using this device over the previous technology can be seen through the use of this stopwatch. By being able to pull up the split time for his runner and by timing of the runner with the stopwatch on the device's screen the coach can see if his runner is on pace.

The device can be either a hand held calculator, a smart phone, or a tablet system, such as an iPad.

SUMMARY OF THE INVENTION

The device is a hand held calculating machine with memory that is specifically designed to calculate the split times for runners, swimmers, and bicyclist. The handheld device is created such that a coach can input the distance of the race, the time for which the athlete wishes to run the race, and the distance of the split, and the hand held device will calculate the time in which the runner needs to run the split. The handheld device is also designed with a memory. The coach can keep the split times on many athletes' and/or the split times for an athlete who runs several races. The coach does this by inputting into the device the individual's name, distance of the race, time in which the athlete wishes to run the race, distance of the split, and then the hand held device will calculate the split time and store the individual's name, with the distance of the race, the distance of split, the time in which the runner wishes to run the race, and the split time. Thus a coach could easily call up this information by just typing in the athlete's name. The device can store several different sets of data for an individual athlete or several sets of data for several different athletes. The handheld device can be a specific device design for this use or a Smartphone or a tablet computer such as the iPad which runs a program to calculate the split times.

DETAILED DESCRIPTION OF THE INVENTION

Figure 1:
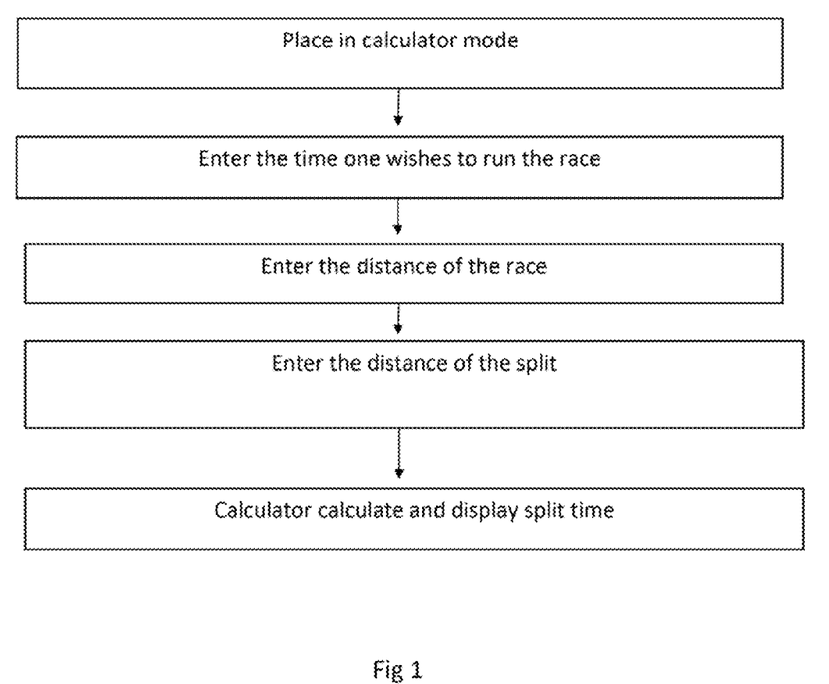
FIG. 1 is a flow chart for calculating split times.
Figure 2:
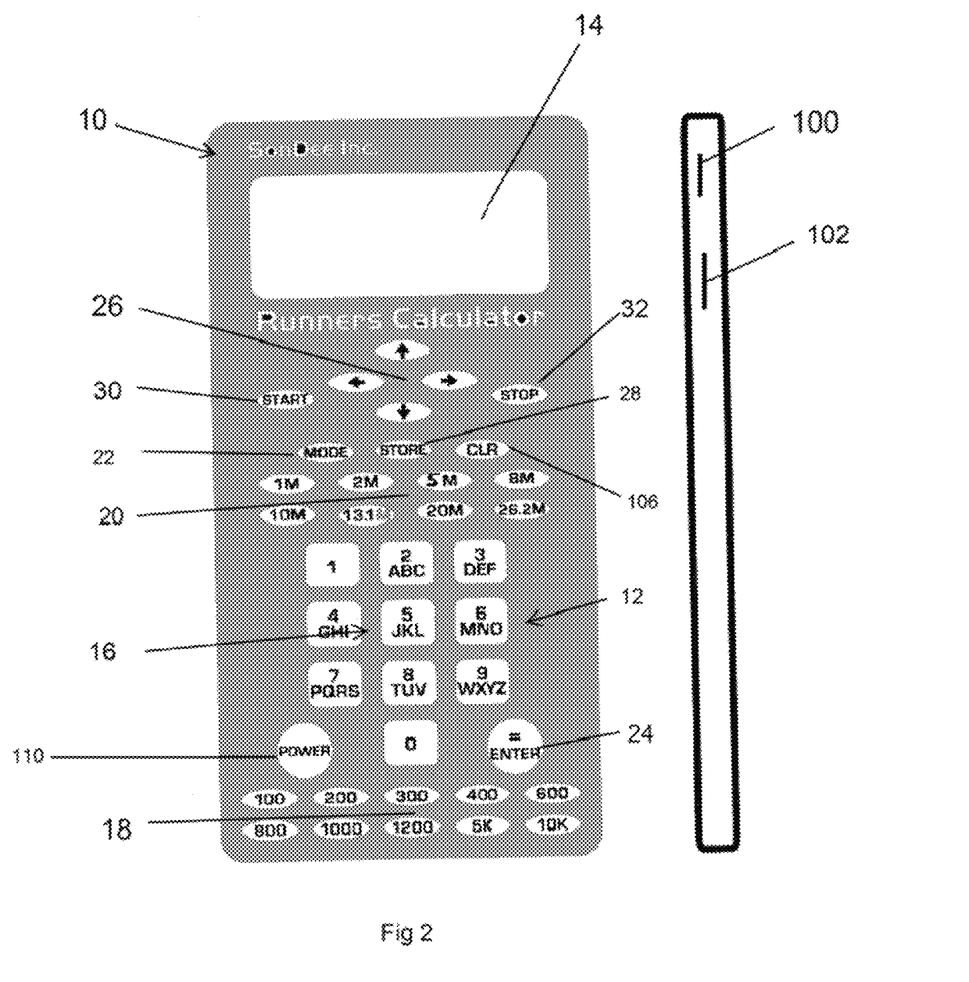
FIG. 2 is the front and side view of the hand held device.

FIG. 1 is a flow chart of how the hand held device works in calculating split pace times. FIG. 2 shows a front view of the hand held device of the preferred embodiment. First, one presses the on/off button 110. Next, one would place the hand held device 10 into the calculator mode. Next, the time that an individual wish to run an event is entered. An example would be if an individual wished to run a marathon in two hours and thirty eight minutes checking his pace in mile intervals. The individual would enter two hours thirty eight minutes and zero seconds by pressing 2, 3, 8, 0, and 0. Then the individual would press the length of the event. In the marathon example, the individual would press the button marked 26.2. Next, the individual would impute the distance of splits or the interval one wishes to check ones pace. In our example of the marathon runner he/she wishes to check his/her pace at mile intervals. Thus, he/she would press the 1 M key. The running calculator would output of the screen 6:02. This would tell the runner that it is necessary for him/her to keep a pace of six minutes and two second every mile of the marathon to run a marathon in two hours and thirty eight minutes. For this embodiment the hand held device 10 need a numeric keyboard 12 and a screen 14.

The hand held device 10 would also need distance keys 18 and 20 that represented length or normal races and length of normal splits. FIG. 2 shows the front view of the hand held device 10 of one embodiment of the invention 10. The hand held device 10 has a screen 14 at the top. This screen 14 can display many alpha characters. Underneath the screen 14 is the keyboard 12. The keyboard 12 contains a telephone like numeric pad 16. The keyboard 12 also contains two sets of distance keys 18 and 20. The first set (the mile set 18) is a set of distances in miles. There are separate keys for 1, 2, 5, 8, 10, 13.1, and 26.2 miles. The second set (the meter set 20) is distance in meters. The meter set 20 has keys of 100, 200, 300, 400, 600, 800, 1000, 1200, 5K, and 10K. These two sets of keys 18 and 20 represent normal race and split distances.

During a race a coach often wishes to know a projected finishing time at the pace the runner is running. This can be calculated with the device. An example of this would be an individual who is running a two-mile race and the coach clocks the individual at one minute 18 seconds for the first 400 m. The coach would enter one minute 18 seconds using the keypad 12 and then press the enter key 24. The coach would then press the 400 m key 18. Lastly, the coach would then press the two-mile key 20. The device would calculate the projected running time for the race. In this example the running time would be 10 minutes 28 seconds.

Figure 5:
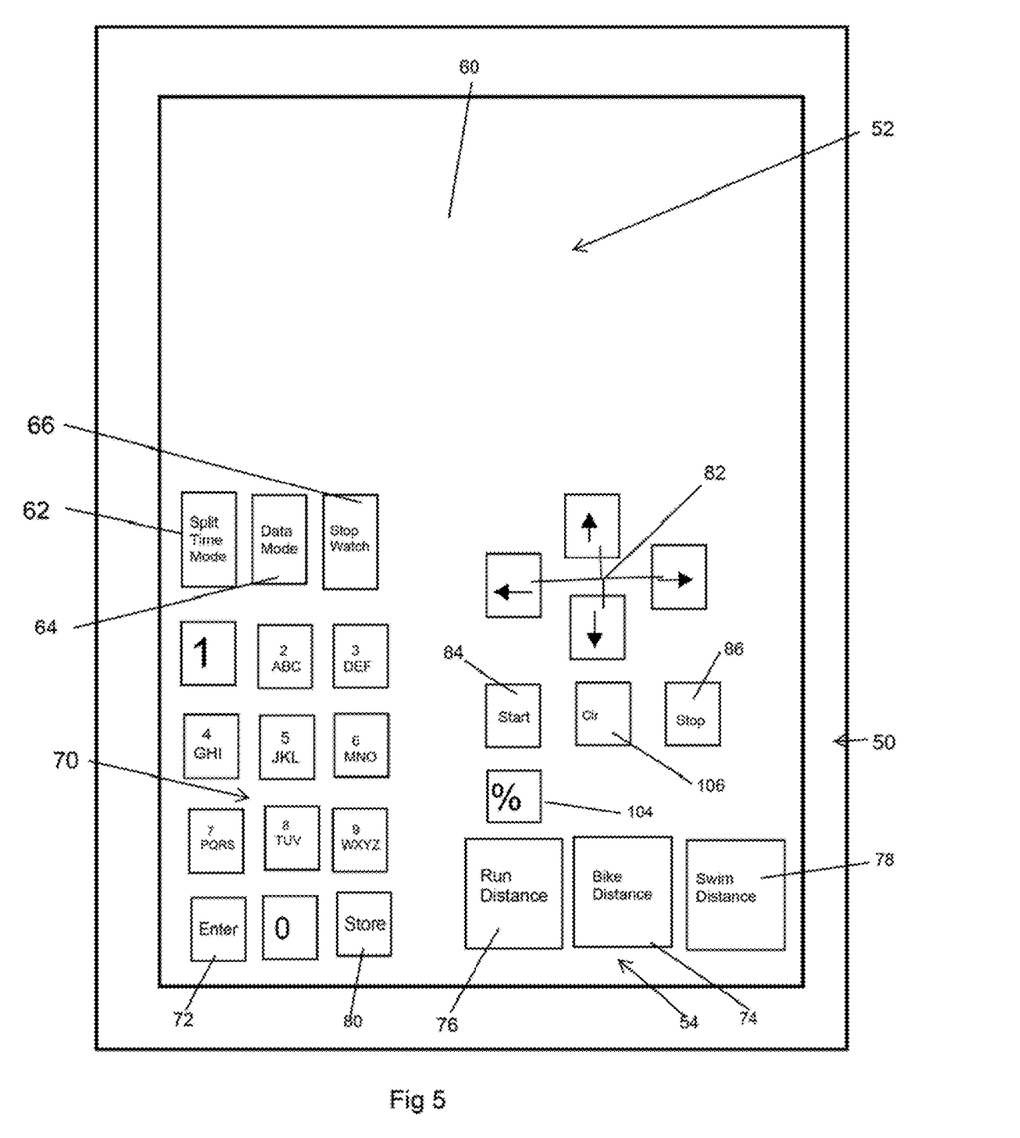
FIG. 5 is another embodiment of the handheld device.

Many times a coach wishes to know specific percentages of the split time. In other words the coach which is to have his runner run at about 65% of the actual split time. This means a coach wants him to run slower than his actual split time. The actual split time would be 65% of the time he is practicing. Many coaches picked either 65%, 75%, or 85% of the actual split time the runner would run in the race. This can easily be calculated by the device. One first calculates the split time for the race they wish to run as explained above. Then the individual presses the percentage key 104 as seen in FIG. 5. The device calculates the times and displayed them on the screen as 65%, 75%, and 85% of the actual split time.

Also the keyboard contains a mode key 22 which lets the hand held device 10 chose between different modes or uses. In the preferred embodiment the hand held device 10 has three modes, the calculator mode, the athlete mode and the stopwatch mode.

Figure 3:
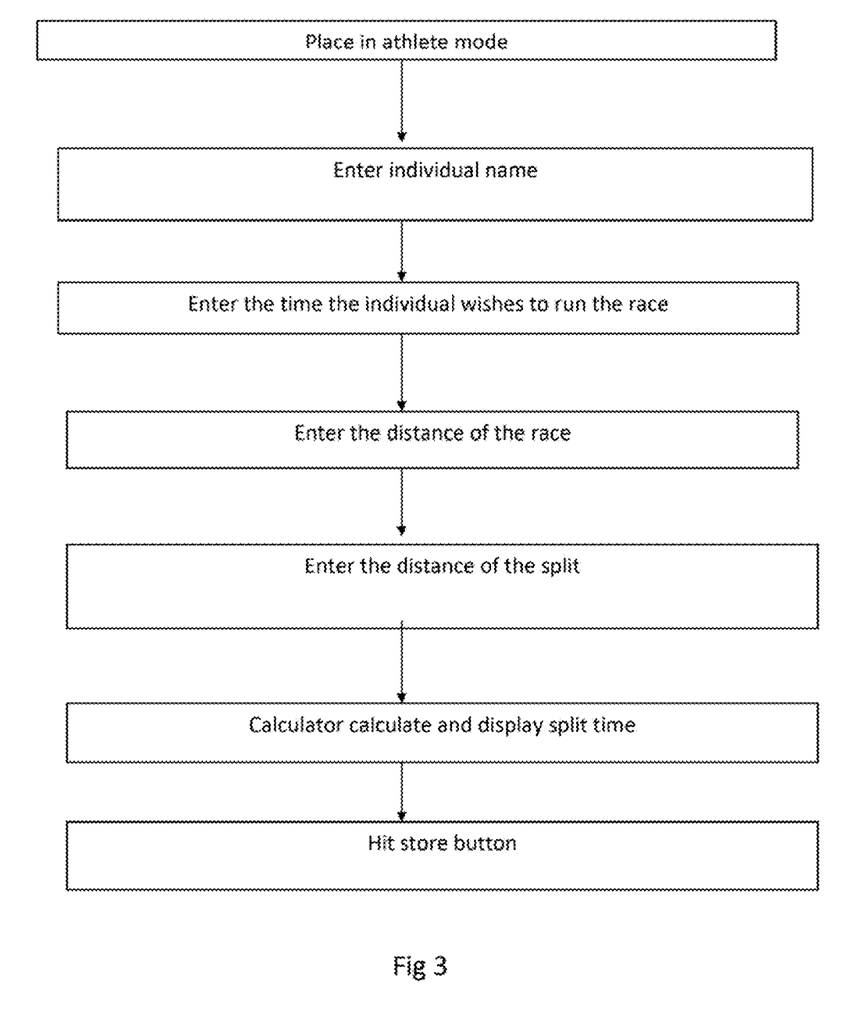
FIG. 3 is a flow chart for the athlete mode.

FIG. 3 is a flow chart for the athlete mode of, the hand held device 10. In this mode an individual or coach can keep track of each athlete's goals and split times. One begins by pressing the mode key 22 and switching to the athlete mode. In this mode the coach types in the athlete's name and presses the enter key 24. This enters the athletes name into the memory for the storing of data that relates to the individual. In the preferred embodiment the coach will recall the athletes name and then the coach will enter the distance of the race the athlete wish to run and the distance of the splits. The hand held device 10 will calculate the split times. The hand held device 10 then stores the split time in memory with the athlete's name, the distance of the race, the race time, and the split times. The hand held device 10 will allow many different distances of the race, the race time and the split time for the same athlete. The hand held device 10 will also allow the storage of many different athletes with their distance of the races, the race times and the split times. For this to work the hand held device 10 will need a screen 14 that displays characters as well as a keyboard 12 that contains the whole alphabet. In the preferred embodiment the applicant uses a keyboard that is similar to a telephone keyboard 16. The individual inputs the characters similar to the way characters are inputted into telephones for texting. The keyboard 12 also contains an enter key 22 for entering the imputes and a store key 28 for storing the information in memory. In the preferred embodiment this keyboard also contains cursor keys 26. This allows the individual making the input to move around the screen 14 and make corrections and inputs.

Figure 4:
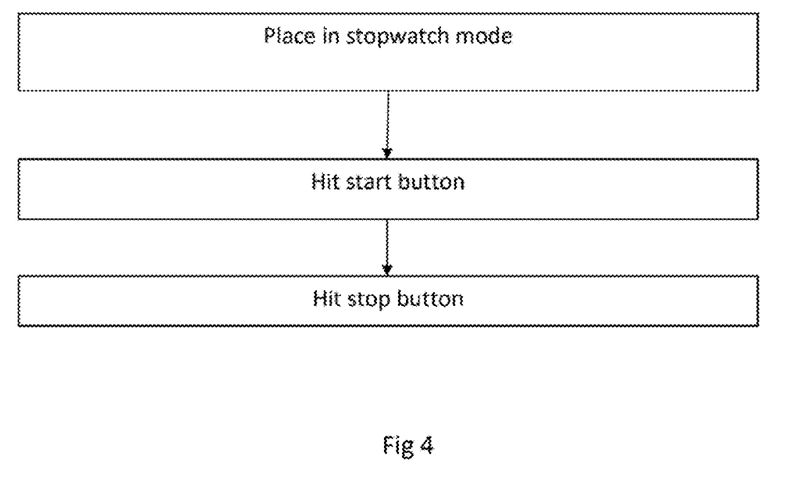
FIG. 4 is a flow chart for the stopwatch mode.

The last mode in the preferred embodiment is the stopwatch mode. FIG. 4 shows the flowchart of using this method. One begins by using the mode key 22 to place the held device 10 in the stopwatch mode. On the keyboard there is a start button 30 and stop button 32. When the coach wishes to begin the stopwatch he would press the start button 30. The time that is elapse from the pressing of the start button 30 is shown on the screen 14. When the coach wishes to stop the stopwatch he presses the stop button 32. To clear the screen 14 and the timer one presses the CLR button 106. Than the coach can uses the stopwatch feature again to time another race.

The hand held device 10 can be easily adapted for coaches in other racing sports. For swimming the coach need the same exact information as to lap or split times as a coach for runners. Thus the three modes and all the calculation would be exactly the same. The only difference in the hand held device 10 would be the distance keys 18 and 20. In swimming the distances are shorter. This would be reflected in the distance keys. These keys would have the distance of the races for swimming. For bicycling a coach would need the same exact information as to split times as a running or swimming coach. Thus, the three modes and all the calculation would be exactly the same as for running or swimming. The only difference is that bicycling would require much longer distances than running and swimming.

Figure 5A:
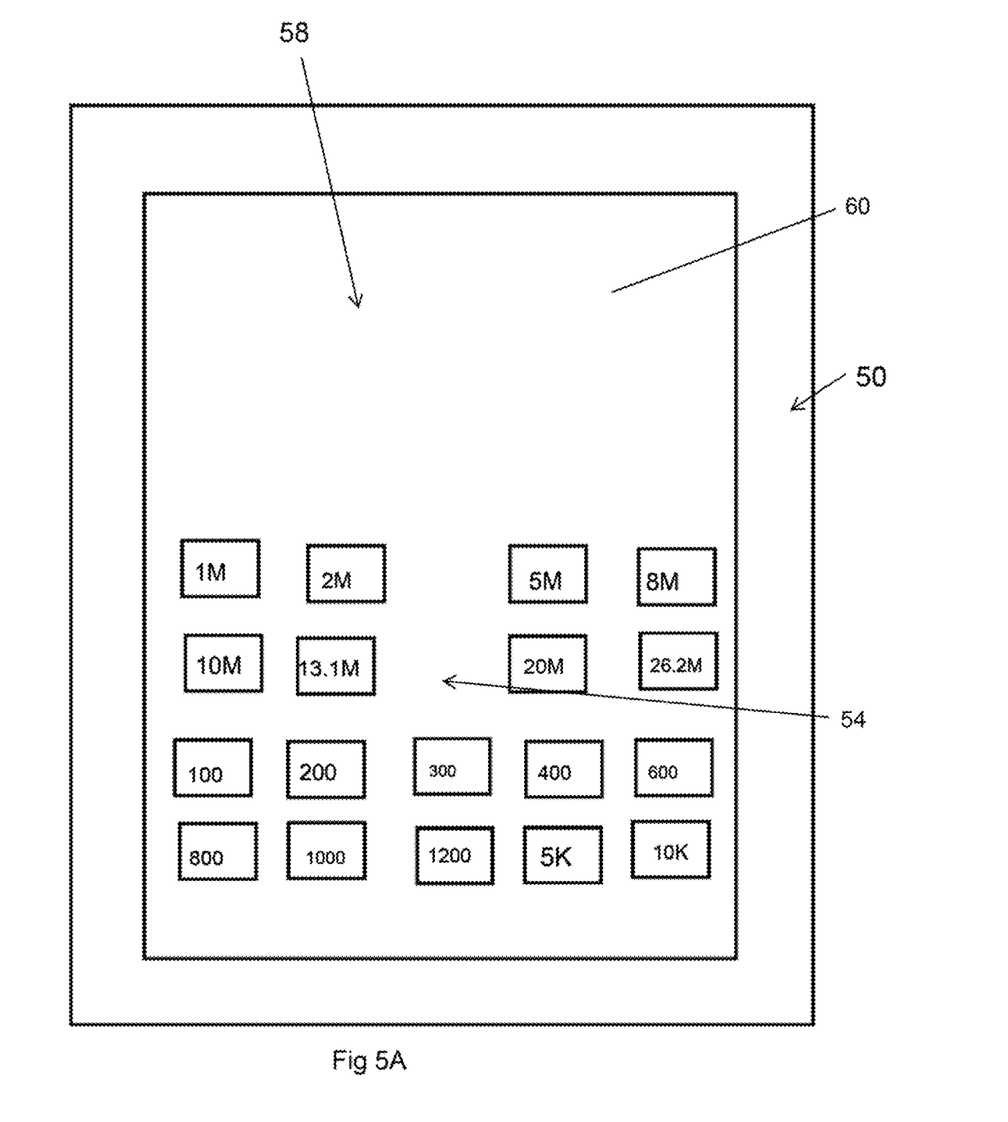
FIG. 5A is a screen produce by the second embodiment.

FIG. 5 shows another embodiment of the invention. In this embodiment the handheld device 50 is a smart phone, handheld reader, iPad, or other type of handheld computer. FIG. 5 shows the screen 52 on a common smart phone or iPhone. These screens 52 usually encompass the full front of the handheld device 50. The front of the device looks very similar to the hand held device 10 described in the above embodiment. Instead of having buttons, the device has icons which can be touched and work similar to buttons. Due to the size of the screen 52, the screen could be designed with less buttons then the hand held device 10 in the above embodiment. Such that the distances keys could be designed such that the original screen only contains a distant button 56. When the distance button 56 is pushed a new screen 58 comes up with all the distances of the races. FIG. 5A shows a configuration of a distance screen 58 that could be used. In FIGS. 5 and 5A the screens 52 and 58 contains a blank area 60 at the top. Under this blank area 60 are several icons that represent buttons to be pushed. As shown in FIG. 5 under the blank area would be the mode keys 62, 64, and 66. These keys would be for the calculator mold key 62, stopwatch mode key 64, and athlete mode 66 just as in the previous embodiment. In the preferred embodiment when these keys 62, 64, and 66 are hit the program jumps to that mode and it could display a new screen for that mode. When the program of the Smartphone begins to run it automatically places the program in the calculator mode. Thus hitting the calculator mode key 62 the screen would stay the same. Under the mode keys would be a telephone like keypad 70 in icons to press in numbers. There would also be an enter key icon 72. When an individual wish to enter the time he wished to run the race he would punch in the numbers. Under the telephone like keypad 70 would be the distance keys. These are distance keys could be all on the same screen. This in fact would be probably true for a tablet or an iPad program since the tablet or iPad has a much bigger screen. Since most smart phones contain very small screens the running distances would be just a single key 52 which when pressed would bring up a new screen with the running distances buttons 54 as seen in FIG. 5A. An individual would press the icon that represent the length of the race and then the icon that represent the distance of the split. The program would take you back to the original screen 50 and display in the area that was blank the split time.

The application for the Smartphone can be easily adapted for coaches in other racing sports. As I point out above for swimming and bicycling the coach need the same exact information as to lap or split times as a coach for runners. Thus the three modes and all the calculation would be exactly the same. The only difference in the hand held device 50 would be the distance keys 54. In swimming the distances are shorter and for bicycling the distances are longer. This would be reflected in the distance keys 54. These keys 54 would have the distance of the races for swimming and bicycling. The embodiment could take the form of separate programs, one program for swimming, one program for running, and one program for bicycling. Or, the application could be one program for all three sports. If the application is a single program than the distance of the races for swimming, running and bicycling would be on a separate screen. The opening screen would have three keys for distance, one key for bicycling distances 74, one key for running distances 76 and one key for swimming distances 78 as shown in FIG. 5. When one of these keys is touched, a new screen would appear with the distances for the sport of the key that was touched. The other two modes, stopwatch, and athlete, would be exactly the same for all three sports.

In the athlete mode for a smart phone or a tablet computer the opening screen 50 would contain a keyboard 70 that contains the whole alphabet. This could be a telephone like keyboard or a typewriter like keyboard. The program could allow the individual using the keyboard to choose this type of keyboard. In athlete mode the coach types in the athlete's name and hit the enter key 72. This enters the athlete's name into the memory for the storing of the data that relates to the individual. In the preferred embodiment the coach will recall the athlete's name and then the coach will enter the distance of the race the athlete wish to run and the distance of the splits. The smart phone or tablet computer will calculate the split times. The smart phone or tablet computer then stores in memory with the athlete's name, the distance of the race, the race time, and the split times. The smart phone or the tablet computer will allow many different distances of the race, the race time and the split time for the same athlete. The smart phone or tablet computer will also allow the storage of many different athletes with their distance of the races, the race times and the split times. The keyboard 70 also contains a enter key 72 for entering the imputes and a store key 80 for storing the information in memory. In the preferred embodiment this keyboard also contains cursor keys 82. This allows the individual making the input to move around the screen 70 and make corrections and inputs.

The stopwatch mode for a smart phone or a tablet computer works exactly like the stopwatch mode in the first embodiment. One begins by using the mode key 66 to place the smart phone or a tablet computer in the stopwatch mode. On the next screen there is a start button 84 and stop button 86. When the coach wishes to begin the stopwatch he presses the start button 84. The time that has elapse from the pressing of the start button 84 is shown on the screen 60. When the coach wish to stop the stopwatch he would presses the stop button 86. To clear the screen 14 and the timer one presses the CLR button 106. Than the coach can uses the stopwatch feature again to time another race.

Many other features can be added to the device. FIG. 2 shows the slot 100. This slot is designed for a memory card. Memory cards can be added to the system to increase the memory of system. The memory card could also contain programs and applications which would add to the features of the device. FIG. 2 also are shows slot 102. Slot 102 is a UBS port. This enables the calculator to be attached to a computer. The calculator can be programmed to receive or transmit memory to a computer. This would enable the coaches using the device to keep track of an unlimited number of individuals and their split times.

I claim:
1. A running calculator comprising:
a. a housing;
b. an off on button on the front of the housing;
c. a numeric set of keys on the front of the housing;
d. an enter button on the front of the housing;
e. a set of keys that represent the distances of races on the front of the housing;
f. a set of keys that represent the distances of splits on the front of the housing;
g. screen that can represent numerical characters on the front of the housing;
h. circuitry within the housing for displaying the numeral of the numeric key imputed on the screen;
i. internal calculating circuitry within the housing and connected electronically to the numeric set of keys, the set of key that represent the distances of races, and a set of keys that represent the distances of splits and the screen that can calculate the split time of an individual when inputted as follows:
  1. entering the time the individual wants to run the race through the numeric set of keys;
  2. entering the distance of the race through the numeric set of keys that represent the distance of the races;
  3. entering the distance of splits through the set of keys that represent the distance of splits;
j. wherein the internal calculating circuitry receives the inputs and calculates the split time and displays the split time upon the screen;
k. a store button on the front of the housing;
l. a set of keys that allows the input of letters;
m. circuitry within the housing for displaying the imputed letters from the set of the keys on the screen;
n. a set of keys that allows correction of the characters on the screen;
o. internal memory circuitry within the housing that allow the storage and retrieval of information and is connected electronically to the numeric set of keys, the set of key that represent the distances of races, and the set of keys that represent the distances of splits, the mode key, the set of keys that allows correction of the characters on the screen, set of keys that allows the input of letters and the screen;
p. a mode button on the front of the housing which can activates the internal memory when pressed;
q. wherein when the mode button is pressed and it activates the internal memory circuitry, an individual's name can be entered through inputs from the set of keys that represent letters, a goal time which the individual wish to run the race can be entered through inputs form the numeric set of keys, and a distance for the race the individual runs can be entered though the input of the set of keys that represent the distances of races, and upon pressing the store button this information will be stored within the internal memory circuitry for future display on the screen with individuals split times calculated for the race.
2. A running calculator as in claim 1 wherein:
a. the internal memory circuitry can be activated by pressing the mode button at which time the internal memory circuitry displays on the screen the names stored in the internal memory circuitry;
b. a set of keys that allows the choosing of the name stored in internal memory
c. wherein upon the choosing of the name the internal memory circuitry displays upon the screen the name, the length of the race, the goal time, and the splits.

3. A running calculator as in claim 2 wherein:
a. internal calculating circuitry can calculate the project race time of an individual when inputted as follows:
   i. entering the time the individual run the split through the numeric set of keys;
   ii. entering the distance of splits through the set of keys that represent the distance of splits;
   iii. entering the distance of the race through the numeric set of keys that represent the distance of the races;
b. wherein the internal calculating circuitry receives the inputs and calculates the race time and displays the race time upon the screen.

4. A running calculator as in claim 2 further comprising:
a. a stop button on the front of the housing;
b. a start button on the front of the housing;
c. a clr button on the front of the housing;
d. circuitry within the housing that is connected to the start button, the stop button, the clr button and the screen that runs a timer that can be used as a stopwatch when inputted as follows:
   i. pressing the start button activates a timer which displays on the screen the time that has past;
   ii. Pressing the stop button stops the timer and the end time is displayed on the screen;
   iii. Pressing the clr key clears the screen and the timer is set at zero.

5. A running calculator as in claim 1 wherein:
a. the off on button is a icons that can be touch to make a choice.

6. A running calculator as in claim 1 wherein:
a. the enter button is a icons that can be touch to make a choice;
b. the numeric set of keys are icons that can be touch to make a choice;
c. the set of keys that represent the distances of races are icons that can be touch to make a choice;
d. the set of keys that represent the distances of splits are icons that can be touch to make a choice;
e. the set of keys that allows the input of letters are icons that can be touch to make a choice;
g. the store button is a icons that can be touch to make a choice;
h. the mode button is a icons that can be touch to make a choice;
i. the set of keys that allows correction of the characters on the screen are icons that can be touch to make a choice.

7. A running calculator as in claim 6 wherein:
a. the internal memory circuitry can be activated by pressing the mode icon at which time the internal memory circuitry displays on the screen the names stored in the internal memory circuitry;
b. a set of icons that allows the choosing of the name stored in internal memory;
c. wherein upon the choosing of the name the internal memory circuitry displays upon the screen the name, the length of the race, the goal time, and the splits.

8. A running calculator as in claim 7 wherein:
a. internal calculating circuitry can calculate the project race time of an individual when inputted as follows:
   1. entering the time the individual run the split through the numeric set of icons;
   2. entering the distance of splits through the set of icons that represent the distance of splits;
   3. entering the distance of the race through the numeric set of icons that represent the distance of the races;
b. wherein the internal calculating circuitry receives the inputs and calculates the race time and displays the race time upon the screen.

9. A running calculator as in claim 6 further comprising:
a. a stop icon on the front of the housing;
b. a start icon on the front of the housing;
c. a clr icon on the front of the housing;
d. circuitry within the housing that is connected to the start icon, the stop icon, the clr icon and the screen that runs a timer that can be used as a stopwatch when inputted as follows:
   i. pressing the start icon activates a timer which displays on the screen the time that has past;
   ii. pressing the stop icon stops the timer and the end time is displayed on the screen;
   iii. pressing the clr icon clears the screen and the timer is set at zero.

* * * * *